(12) United States Patent
DiPaolo et al.

(10) Patent No.: US 7,779,701 B2
(45) Date of Patent: Aug. 24, 2010

(54) PRESSURE SENSOR APPARATUS

(75) Inventors: David J. DiPaolo, Norwood, MA (US); Jeffrey P. Silveria, North Attleboro, MA (US)

(73) Assignee: Sensata Technologies, Inc., Attleboro, MA (US)

( * ) Notice: Subject to any disclaimer, the term of this patent is extended or adjusted under 35 U.S.C. 154(b) by 0 days.

(21) Appl. No.: 12/472,954

(22) Filed: May 27, 2009

(65) Prior Publication Data

US 2009/0293630 A1 Dec. 3, 2009

Related U.S. Application Data

(60) Provisional application No. 61/057,898, filed on Jun. 2, 2008.

(51) Int. Cl.
*G01L 7/00* (2006.01)
(52) U.S. Cl. ...................................................... 73/756
(58) Field of Classification Search .................. 73/753, 73/756, 715, 716; 361/283.1–283.4
See application file for complete search history.

(56) References Cited

U.S. PATENT DOCUMENTS

| 3,817,107 | A | * | 6/1974 | Shimada et al. ............... 73/727 |
|---|---|---|---|---|
| 4,982,351 | A | | 1/1991 | Kawate et al. |
| 5,402,683 | A | * | 4/1995 | Kosugi et al. .................. 73/756 |
| 5,670,722 | A | * | 9/1997 | Moser et al. ................... 73/756 |
| 5,709,337 | A | * | 1/1998 | Moser et al. ............. 228/124.6 |
| 5,814,779 | A | | 9/1998 | Verras et al. |
| 6,453,747 | B1 | * | 9/2002 | Weise et al. ................... 73/715 |
| 6,782,758 | B2 | | 8/2004 | Weise et al. |
| 7,363,820 | B2 | * | 4/2008 | Kurtz et al. ................... 73/754 |

* cited by examiner

*Primary Examiner*—Jewel Thompson
(74) *Attorney, Agent, or Firm*—Russell E. Baumann

(57) ABSTRACT

A high pressure, miniature pressure sensor has a cup-shaped housing having an open end closed by a metal substrate. A raised stress isolation pedestal portion is formed on the substrate that receives a stress isolation glass pedestal element and in turn a silicon pressure sense element, all having closely matched CTEs to minimize temperature induced stresses. A fluid passageway is formed through the substrate and glass pedestal and an O-ring is placed around the passageway on the lower side of the substrate. A flexible circuit having a slit tail formed with two lobes for receipt respectively in the housing and on the substrate allows easy access of a solder iron during assembly. Mounting flanges extend from the substrate to facilitate mounting of sensor and minimize transfer of mounting stresses to the sense element.

13 Claims, 4 Drawing Sheets

PRESSURE SENSOR APPARATUS

RELATED APPLICATIONS

This application claims priority based upon U.S. Provisional Application No. 61/057,898, filed Jun. 2, 2008.

FIELD OF THE INVENTION

This invention relates to sensors and more particularly to pressure sensors adapted for use in the automotive industry.

BACKGROUND OF THE INVENTION

It is known to use sensors to sense pressure in the automotive field of use. Typically these sensors use snap-acting disc technology, capacitive technology and strain gauge technology (MEMS based or by deposited films). Examples of such sensors are described in U.S. Pat. Nos. 4,982,351; 5,814,779 and 6,782,758, and U.S. patent application Ser. No. 12/069,522, all owned by the owner of the present invention.

These sensors have gained wide use and acceptance for automotive pressure applications. There still is, however, a need for pressure sensors with high accuracy that have reduced size, particularly in height and diameter.

SUMMARY OF THE INVENTION

An object of the present invention is the provision of a vehicular pressure sensor equal to or less than 18 mm in diameter and 12 mm in height, excluding an external O-ring and external terminals for connection to the ECU of the vehicle. Another object of the invention is to minimize cost and size while meeting specific quality and performance criteria. Still another object is the provision of a miniature pressure sensor having improved structure to minimize stress transferred to the sense element of the sensor.

Briefly stated, a sensor made in accordance with a preferred embodiment of the invention having a cup-shaped housing mounted on a substrate, incorporates a doped monocrystalline silicon die as the sense element bonded to a borosilicate glass pedestal element which is in turn attached to a metallic pedestal portion of the substrate, all chosen to have closely matching coefficients of thermal expansion, hereinafter referred to as CTEs, and configured to minimize transfer of mounting and temperature stresses to the sense element. The glass pedestal element is attached to the metallic pedestal using leaded glass (solder glass) having a close CTE match for uses requiring a high pressure measurement, e.g., up to 1000 psi or higher. For other lower pressure applications a resin, such as bismaleimide (BMI) resin having a slightly higher CTE can be used to attach the glass pedestal element to the metallic pedestal portion. A sensor made in accordance with a preferred embodiment of the invention has a slit tail flexible circuit that allows separation of the housing and the substrate used to close an opening of the housing to provide access for a solder iron during assembly of the sensor.

The substrate on which the metal pedestal is formed is preferably provided with a pair of flanges extending radially outwardly from the sensor to facilitate mounting of the sensor and which serve to minimize the transfer of mounting stress forces to the pedestal of the substrate. The two flanges are preferably of different size in order to provide a key for manufacturing. In a preferred embodiment a recess is formed in the bottom surface of the substrate forming an elastomeric element receiving seat around a fluid passageway that extends up to the sense element through the substrate including the pedestal portion, and the glass pedestal element. In a modified preferred embodiment, the elastomeric element receiving seat is formed by welding a separate ring to the bottom surface of the substrate with the flanges extending outwardly between the housing and the ring.

BRIEF DESCRIPTION OF THE DRAWINGS

The accompanying drawings which are incorporated in and constitute a part of the specification illustrate preferred embodiments of the invention and, together with the description, serve to explain the objects, advantages and principles of the invention. In the drawings.

DETAILED DESCRIPTION OF PREFERRED EMBODIMENTS

Figure 1:
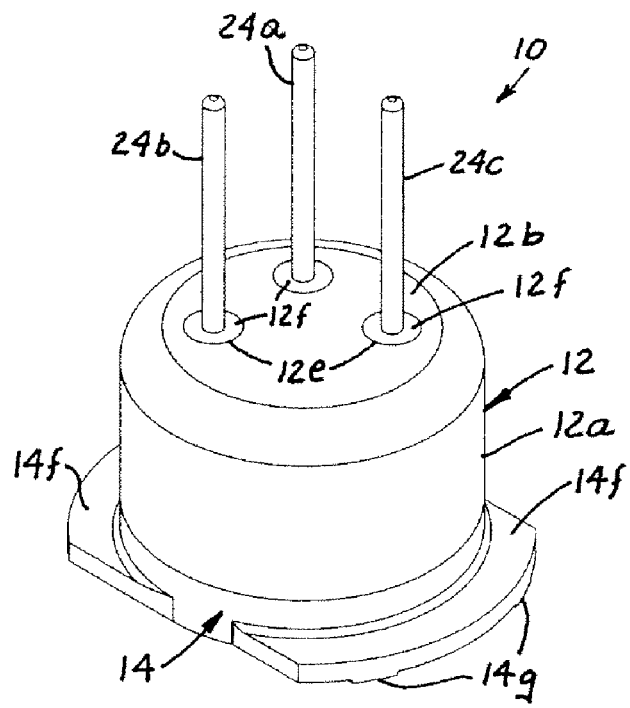
FIG. 1 is a perspective front view of a sensor made in accordance with the invention taken from above the sensor.
Figure 2:
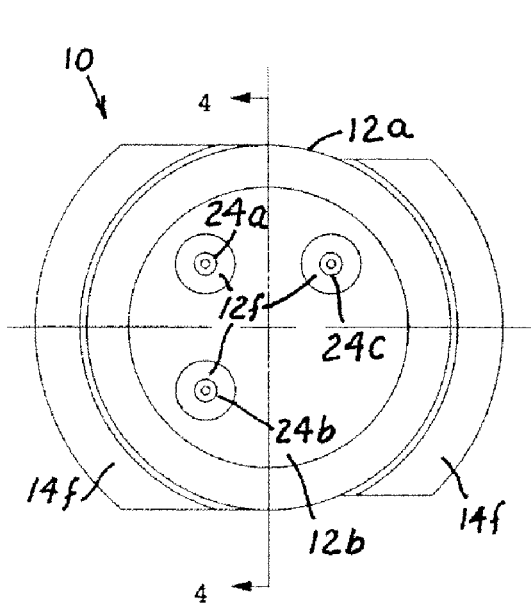
FIG. 2 is a top plan view of the FIG. 1 sensor.
Figure 3:
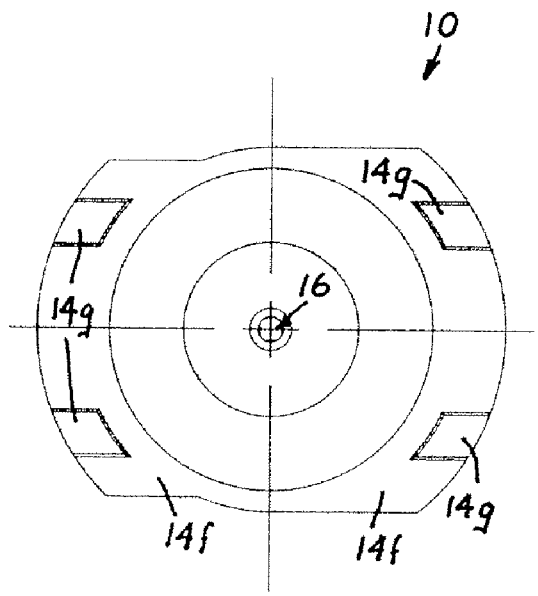
FIG. 3 is a bottom plan view of the FIG. 1 sensor.

With reference to the drawings, pressure sensor 10 comprises a generally cup-shaped housing 12 formed of suitable metal material, such as a carbon steel and having a side wall 12a, an end wall 12b and a circular open end formed by the distal free end of side wall 12a defining a chamber 12d.

Figure 4:
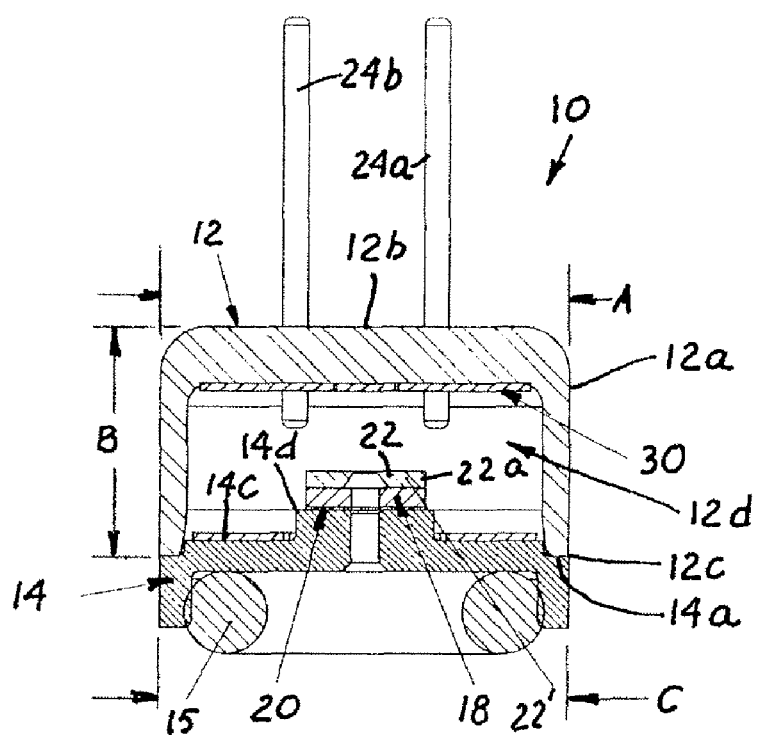
FIG. 4 is a cross sectional view taken on line 4-4 of FIG. 2.
Figure 5:
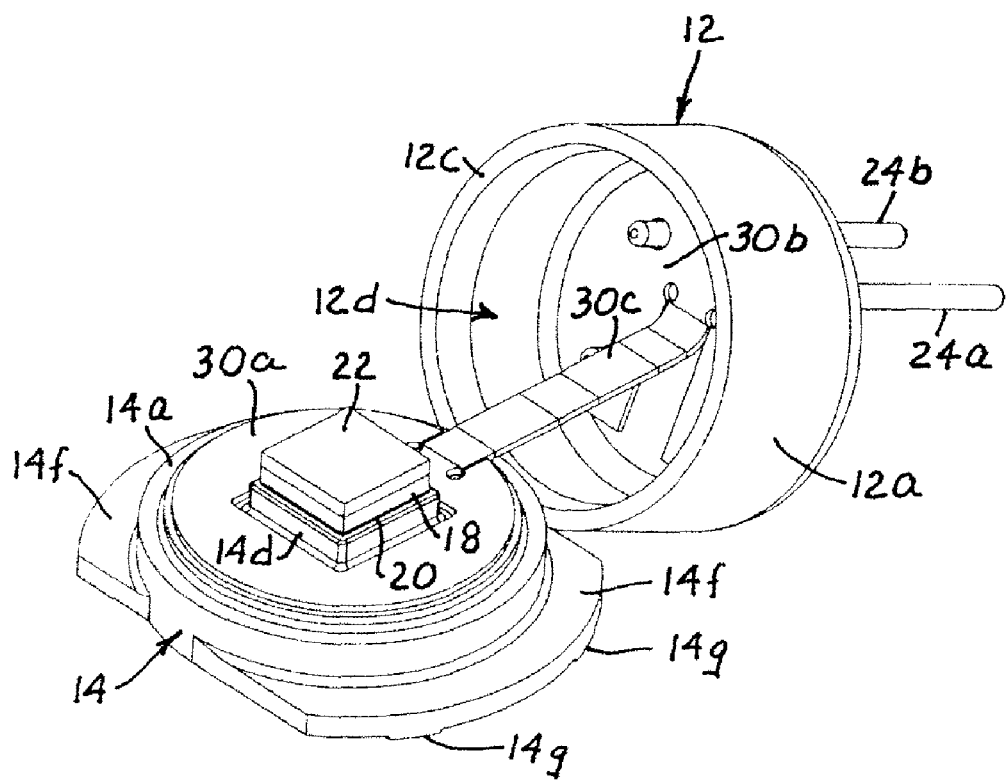
FIG. 5 is a perspective view of a partially assembled sensor of FIG. 1 taken from above the structure.

A metallic substrate 14 has a generally circular configuration and is formed with a housing wall receiving annular flange 14a around the upper outer periphery thereof, (see FIGS. 4, 5). A recess 14b is formed in the bottom of the substrate forming an O-ring seat that extends around a fluid passageway 16 to be discussed. An O-ring 15 of suitable elastomeric material typically having a size selected to form an interference fit in recess 14b is disposed therein. The specific geometry of the recess and O-ring are selected to allow expansion under the worst tolerance stack condition while simultaneously preventing the substrate side walls from making contact with the mating customer equipment thus reducing the effects of mounting sensitivity. The spacing between the substrate and mating customer equipment can vary between 0.05 and 0.40 mm while maintaining a compression on the elastomer of 15 to 40%. A 2.62 mm cross-section elastomer, extremely large for this size package, is used. The benefits of using an O-ring of this size is the minimization of the effects of tolerances and compression set on the elastomer's ability to properly contain the pressure media to the pressure cavity over a temperature range of −40 to 150 degrees C. over the life of the product.

Although an O-ring is described in the present embodiment, it is within the purview of the invention to use other elastomeric configurations, such as a square cut gasket. Further, mounting stress can also be limited by use of spaced apart stop surface bumps 14g formed in flanges 14f of substrate 14. In this instance, the substrate bumps engage with the customer mating surface and the elastomer is compressed to that extent. Although four stops are shown in the drawings, if desired, three stops could be employed.

End wall 12b of the housing is formed with terminal receiving apertures 12e for receipt therethrough of terminals 24a, 24b, and 24c, respectively. The terminals are isolated from end wall 12b by glass seals 12f. The thickness of end wall 12b is selected to provide a robust mounting surface for the terminals. The terminals extend into chamber 12d for electrical connection with flexible circuit 30, to be discussed. For reasons of simplicity in illustration the wire bonds are not shown in the drawings.

Substrate 14 is formed with a flat top surface 14c preferably having a centrally formed, raised stress isolation pedestal portion 14d formed with a flat top surface for receiving a glass stress isolation pedestal element 18 attached thereto using suitable adhesive 20 to be discussed. Glass pedestal piece 18, in turn, is bonded to sense element 22 to be discussed.

The material of substrate 14 is selected to closely match the CTE of glass pedestal piece 18 in order to limit mounting sensitivity. In a sensor having an 18 mm or less outer diameter and a 12 mm or less height, the height of metal pedestal 14d is preferably between 0.35 and 2.5 mm. Pedestal portion 14d is generally square in top plan view along with glass pedestal element 18 and sense element 22. The height of glass pedestal 18 can range from 0.2 to 2.5 mm. The width of pedestal portion 14d can be slightly greater than that of sense element 22 to facilitate placement by providing a reference edge.

In a preferred embodiment of the invention the sense assembly includes sense element 22 comprising a doped monocrystalline silicon ASIC having a CTE of 2-3; glass pedestal element 18 comprising borosilicate glass or Pyrex having a CTE of 3; adhesive 20 comprising leaded glass, i.e., solder glass, with a low firing temperature having a CTE of approximately 6; and substrate pedestal portion 14d formed of ASTM F-15 having a CTE of 5-6.

The silicon die, i.e., sense element 22 with conditioning electronics, and glass pedestal element 18 are bonded at an elevated temperature by clamping the sense element and the glass pedestal element between two metal electrodes and creating an electric field which penetrates the elements. The glass element contains sodium ions which, at the elevated temperature, are displaced from the bonding surface of the glass by the electric field. The depletion of the sodium ions near the surface of the glass makes the glass highly reactive with the silicon sense element forming a chemical bond.

As noted above, the sense element assembly comprises the sense element bonded to the glass pedestal in turn attached to the metal pedestal portion of the substrate. The attachment of the sense element (ASIC) 22 bonded to the glass pedestal element 18 to the metal pedestal portion 14d formed of ASTM F-15 can be effected by use of certain resins, such as bismaleimide (BMI), leaded and other glasses, solder, polyimide or a eutectic. In general the ideal ASIC attachment properties include a low modulus of elasticity, high adhesive strength and matched CTEs. If the CTE mismatch is large a low modulus is required. If the mismatch is small, higher modulus materials can be tolerated. For applications requiring high pressure measurement (e.g., 1000 psi or higher) the leaded glass has been found to be effective.

The above sense element assembly of the metal stress isolation pedestal portion 14d combined with the glass stress isolation pedestal element 18 provides stress relief or isolation from mounting and temperature caused stresses from being transferred to the sense element.

Substrate 14 is also provided with mounting flanges 14f that extend radially outwardly from two opposite sides of substrate 14. Mounting flanges 14f not only provide a convenient way to clamp the sensor in a desired location for use in a fluid system to be monitored, the clamping forces are external of housing 12 and separated from the pedestals thereby minimizing the transfer of mounting stresses to the pedestal area. Preferably the flanges are formed of different sizes in order to provide a key for manufacturing.

Figure 6:
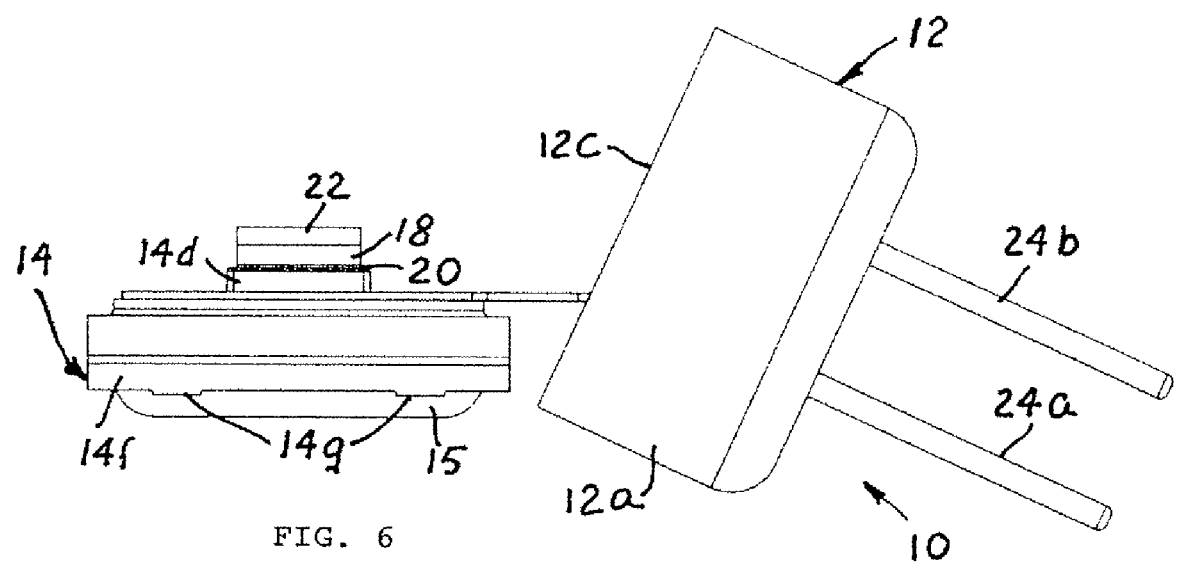
FIG. 6 is a side view of the structure shown in FIG. 5.
Figure 7:
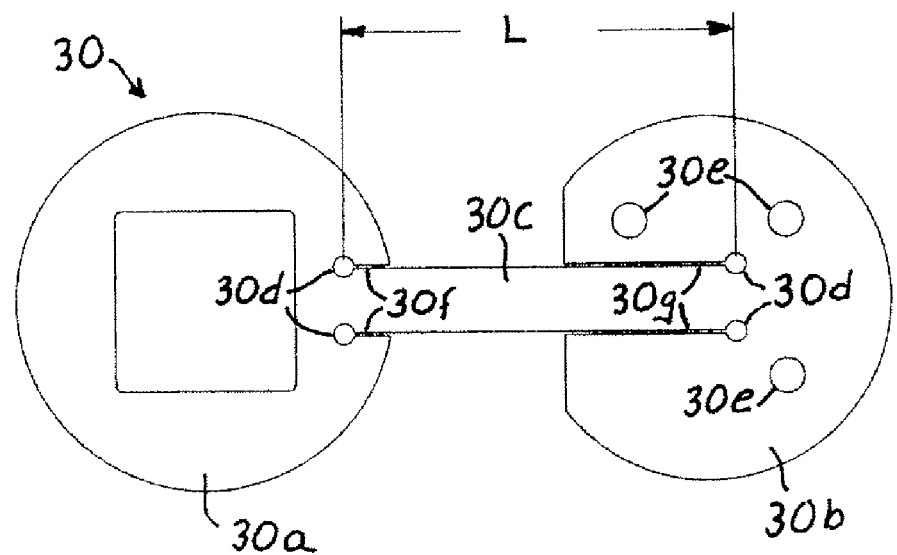
FIG. 7 is a top plan view of a flexible circuit used in the FIG. 1 sensor.

With particular reference to FIGS. 5-7, a flexible circuit 30 is formed of conventional material and has first and second spaced apart generally circular lobes 30a, 30b connected by a bridge portion 30c with lobe 30a received on flat surface 14c of substrate 14 and lobe 30b on the inside surface of end wall 12b of housing 12. Lobe 30a has a centrally located opening matching but slightly larger than the peripheral configuration of pedestal portion 14d. Bridge portion 30c is slit into lobes 30a, 30b at 30f and 30g, respectively, and extends between circular stress relief apertures 30d at each end thereof. Lobe 30b is also provided with terminal receiving apertures 30e which are aligned with terminal members 24a, 24b, 24c that extend through apertures 12e isolated from the housing by glass seals 12f. It will be appreciated that placement of the terminal leads is a matter of choice. For example, they could extend through side wall 12a if desired however, in the FIG. 1 embodiment the end wall 12b is made relatively thick relative to side wall 12a to provide an adequate surface for robust mounting of the terminals while allowing use of a thinner side wall thereby requiring less material for the housing and minimizing the diameter of thereof.

A circuit, not shown, is formed on flexible circuit 30 to provide superior protection for the conditioning electronics 22a from EMC and ESD events as is known in the prior art.

The flexible circuit of FIG. 7, having the slit tail or bridge portion extending into the lobes, allows the use of a one piece housing with glass to metal seals. That is, manufacturing is greatly simplified by being able to place the housing in a position clear of the substrate but connected thereto by the bridge portion 30c to thereby facilitate soldering within the housing and at the substrate. Without the slit in the flex circuit it would not be possible to solder the flex circuit because the sensor would not open sufficiently to provide access for a solder iron. The length of the slit in relation to the housing wall height and diameter and the diameter of the substrate are all critical in providing this feature. The following equation represents the slit tail or bridge portion length relative to the housing wall height, housing diameter and substrate diameter (housing wall thickness in a sensor made in accordance with this preferred embodiment of the invention is maintained at 0.85 mm):

Slit tail length $(L)=0.242*$(housing wall height)$+$ $0.518*$(substrate $OD)+0.414*$(housing $OD$).

Reference may be had to FIG. 4 for housing OD—A, housing wall height—B and substrate OD—C, and to FIG. 7 for bridge length—L. All dimensions are in millimeters. Slit tail lengths (bridge portion 30c) within ±0.4 mm of the results of this equation will work well.

Upon completion of the soldering operation the housing is set back on flange 14a and the housing and substrate are welded together to form a liquid tight seal.

Figure 8:
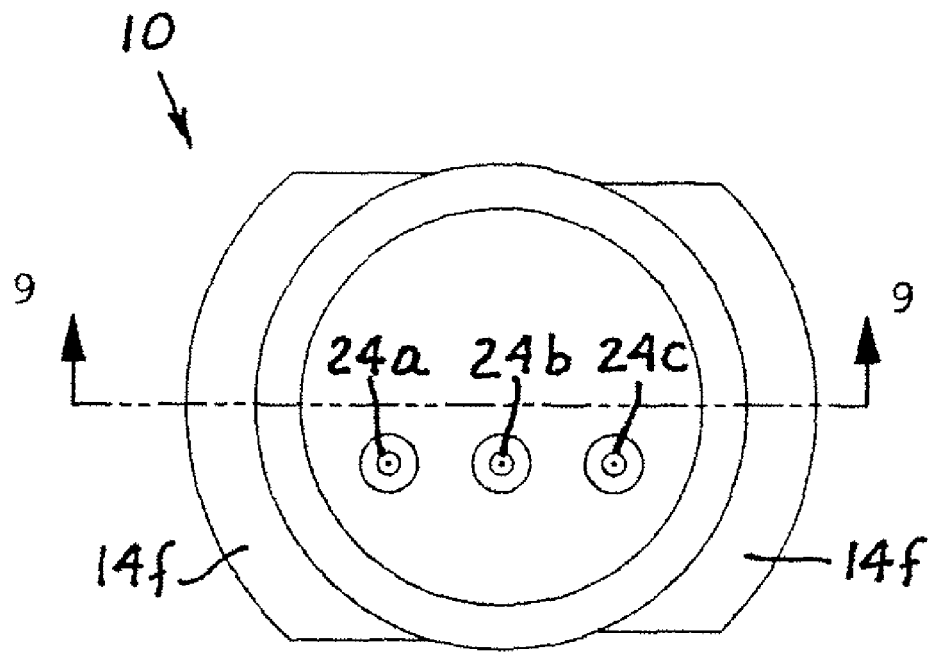
FIG. 8 is a top plan view of a modified preferred embodiment.
Figure 9:
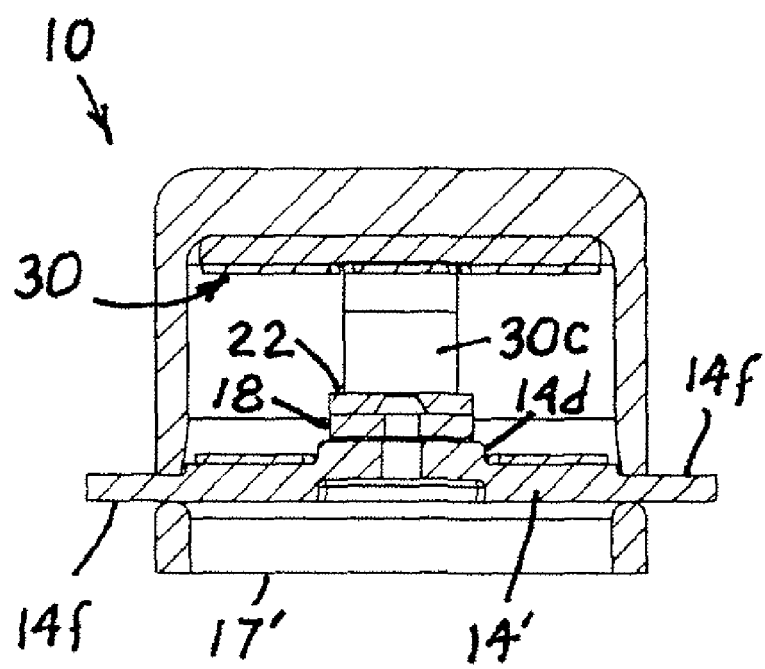
FIG. 9 is a cross sectional view taken on line 9-9 of FIG. 8.

FIGS. 8 and 9 show a modified preferred embodiment of the invention in which sensor 10' comprises housing member 12' which is the same as housing 12 of FIG. 1 except, as noted in FIG. 9, terminal leads are aligned in a straight line instead of in the triangular configuration of FIG. 1. Substrate 14' is provided with mounting flanges 14f, as in the FIG. 1 sensor however a separate ring 17 is welded to the bottom side of the substrate aligned with side wall 12a of housing 12 which is welded to the top side of the substrate. Thus ring 17 forms the recess for the O-ring seat. Otherwise the substrate is the same as in the first embodiment. Housing 12 and ring 17 can be formed of carbon steel thereby reducing the amount of the more expensive ASTM F-15 material needed for substrate 14'. Further, this arrangement may be more effective in isolating mounting stresses and limiting transfer of such stresses to the sense assembly.

By way of illustration, pressure sensors made in accordance with the preferred embodiments described above have been made having an outside diameter of 13.0 mm and a height of 11 mm, excluding the terminals and O-ring.

Although the invention has been described with regards to specific preferred embodiments thereof, variations and modifications will become apparent to those of ordinary skill in the art. For example, although a monosilicon sense element having conditioning electronics on the same monosilicon ASIC has been described, it will be understood that, if desired, the ASIC could be split into two portions of silicon with one portion containing the conditioning electronics and the other being used as the sense element. It is therefore the intent that the appended claims be interpreted as broadly as possible in view of the prior art to include all such variations and modifications.

The invention claimed is:

1. A high pressure, liquid tight, miniature pressure sensor comprising a substrate, a cup shaped housing having an open end closed by the substrate forming a chamber, the substrate formed with a centrally located raised stress isolation pedestal portion, a stress isolation glass pedestal element adhered to the stress isolation pedestal portion of the substrate, a pressure responsive sense element fixed to the stress isolation pedestal element, a fluid passageway extending through the substrate including the stress isolation pedestal portion and stress isolation pedestal element in communication with the pressure responsive sense element, conditioning electronics disposed in the enclosure and terminals extending from a location exterior of the housing into the housing for connection to the conditioning electronics and pressure responsive sense element, the pressure responsive sense element, the stress isolation pedestal element and the substrate having closely matched coefficients of thermal expansion to minimize stress forces transferred to the sense element.

2. A pressure sensor according to claim 1 in which the substrate is formed of ASTM F-15.

3. A pressure sensor according to claim 2 in which the glass pedestal element is adhered to the pedestal portion of the substrate by a resin.

4. A pressure sensor according to claim 3 in which the resin is bismaleimide (BMI).

5. A pressure sensor according to claim 2 in which the glass pedestal element is adhered to the pedestal portion of the substrate by leaded glass.

6. A pressure sensor according to claim 1 in which a mounting flange extends radially outwardly from the substrate thereby minimizing transfer of mounting forces to the pedestal portion of the substrate.

7. A pressure sensor according to claim 1 in which an elastomeric element seat is disposed on the bottom surface of the substrate around the fluid passageway.

8. A pressure sensor according to claim 7 in which the elastomeric element seat comprises a recess formed in the bottom surface of the substrate.

9. A pressure sensor according to claim 7 in which the housing has a cylindrical side wall and further comprising a ring matching the cylindrical side wall and aligned therewith attached to the bottom surface of the substrate, the ring forming a recess which serves as the elastomeric element seat.

10. A pressure sensor according to claim 9 further comprising a mounting flange that extends radially outwardly from the substrate thereby minimizing the transfer of mounting forces to the pedestal portion of the substrate.

11. A pressure sensor according to claim 7 further comprising an elastomeric element placed in the elastomeric element seat, the elastomeric element having a thickness sufficiently greater than the depth of the recess to prevent direct engagement between the substrate and a customer's equipment that receives the sensor.

12. A pressure sensor according to claim 1 in which the substrate and housing are generally cylindrical, the chamber in the housing has a top surface and the substrate has a flat surface adjacent to the pedestal portion, further comprising a flexible circuit having two cylindrical lobes spaced apart by a bridge portion, one lobe is received on the top surface of the chamber and the other lobe is formed with a cut-out and is received on the flat surface of the substrate with the pedestal portion extending through the cut-out in the said other lobe, the bridge portion being slit into the lobes to provide a selected length of the bridge to allow separation of the housing and substrate after attachment of the flexible circuit to the respective housing and substrate to facilitate soldering operations during assembly of the sensor.

13. A pressure sensor according to claim 12 in which the length L of the bridge portion is determined by the following formula in which all dimensions are in millimeters:

$$L=0.242*(\text{housing wall height})+0.518*(\text{substrate OD})+0.414*(\text{housing OD}).$$

* * * * *